US011861093B1

(12) United States Patent
Huang

(10) Patent No.: US 11,861,093 B1
(45) Date of Patent: Jan. 2, 2024

(54) CHARGE SOURCE CIRCUIT, ANALOG-TO-DIGITAL CONVERTER AND OLED TOUCH PANEL

(71) Applicant: SILEAD INC., Shanghai (CN)

(72) Inventor: Jingze Huang, Shanghai (CN)

(73) Assignee: SILEAD INC., Shanghai (CN)

( * ) Notice: Subject to any disclaimer, the term of this patent is extended or adjusted under 35 U.S.C. 154(b) by 0 days.

(21) Appl. No.: 18/148,239

(22) Filed: Dec. 29, 2022

(30) Foreign Application Priority Data

Jul. 6, 2022 (CN) .......................... 202210799529.9

(51) Int. Cl.
*G05F 1/575* (2006.01)
*G05F 1/59* (2006.01)
*H03F 3/45* (2006.01)
*G06F 3/041* (2006.01)
*G06F 3/044* (2006.01)

(52) U.S. Cl.
CPC .......... *G06F 3/0412* (2013.01); *G06F 3/0445* (2019.05)

(58) Field of Classification Search
CPC ....... H02M 1/0087; H02M 3/156; G05F 1/10; G05F 1/59; G06F 3/0412; G06F 3/0445
See application file for complete search history.

(56) References Cited

U.S. PATENT DOCUMENTS

2021/0373588 A1\* 12/2021 Wang .................. H03F 3/45273

\* cited by examiner

*Primary Examiner* — Deeprose Subedi
(74) *Attorney, Agent, or Firm* — ZIEGLER IP LAW GROUP LLC

(57) ABSTRACT

A charge source circuit, an analog-to-digital converter (ADC) and an organic light-emitting diode (OLED) touch panel are disclosed. The charge source circuit includes a reference current generation block, a current mirror block and a charge output block. The charge output block is configured to provide an amount of charge as current times time, rather than voltage times capacitance as conventionally done. This dispenses with the use of a voltage division technique, a drive operational amplifier or a great number of capacitors, resulting in circuit simplicity, reduced cost and circuit layout area savings. Moreover, current and time interval sequences can be designed to enable, with a very small area and voltage, continuous adjustability of the amount of charge within a desired range at a higher resolution. An equivalent capacitance corresponding to the amount of charge can be adjusted within a range from tens to hundreds of pF.

20 Claims, 5 Drawing Sheets

CHARGE SOURCE CIRCUIT, ANALOG-TO-DIGITAL CONVERTER AND OLED TOUCH PANEL

CROSS-REFERENCES TO RELATED APPLICATIONS

This application claims the priority of Chinese patent application number 202210799529.9, filed on Jul. 6, 2022, the entire contents of which are incorporated herein by reference.

TECHNICAL FIELD

The present invention relates to the field of OLED touch technology and, in particular, to a charge source circuit, an analog-to-digital converter and an OLED touch panel.

BACKGROUND

A charge source is able to output a suitable amount of charge to a following circuit, for example, for reference subtraction for calibrating an output from a downstream analog-to-digital converter.

A conventional charge source generally provides an amount of charge according to Qdc=Vcom*Cin. Accordingly, in order to achieve a precise voltage Vcom represented by many bits, the use of a voltage division technique and a drive operational amplifier is required. In some conventional solutions, the voltage Vcom is fixed, necessitating the use of many capacitances represented by different numbers of bits for enabling adjustability of the amount of charge. Therefore, the conventional charge sources suffer from an insufficient resolution, a small range of adjustment, a large circuit layout area due to the use of too many capacitors, as well as high circuit cost and high difficulty of implementation caused by the use of a voltage division technique and a drive operational amplifier.

SUMMARY OF INVENTION

It is an objective of the present invention to provide a charge source circuit, an ADC and an OLED touch panel, which are capable of outputting, with a very small layout area and a very small voltage, a precise amount of charge within a wide range. Additionally, through using the charge source circuit to draw or inject such an amount of charge from or to sensed charge on an input electrode of the OLED touch panel, reference subtraction (DC subtraction) of the OLED touch panel can be achieved in an improved manner.

The above objective is attained by a charge source circuit provided in the present invention, which includes: a reference current generation block configured to provide a reference current; a current mirror block coupled to the reference current generation block and configured to minor the reference current; and a charge output block coupled to the current minor block and configured to convert the mirrored current from the current minor block into a corresponding amount of charge and output the amount of charge according to the following formula:

Qdc=Idc*t, where Qdc is the amount of charge output from the charge output block, Idc is a current provided by the charge output block, and t is a period of time in which the charge output block provides the current, wherein the period t is divided into at least two consecutive time intervals with lengths which form a sequence with ratios equal to a power of 2, thereby enabling continuous adjustability of the amount of charge Qdc.

Based on the same inventive concept, the present invention also provides an ADC including an integrator and the charge source circuit of the present invention.

Based on the same inventive concept, the present invention also provides an OLED touch panel including an input electrode and the ADC of the present invention.

Compared with the prior art, the present invention has at least one of the following advantages:

1. Providing an amount of charge according to Qdc=Idc*t instead of Qdc=Vcom*Cin as conventionally done overcomes the problems of high difficulty and high circuit cost that may arise from the use of a voltage division technique and a drive operational amplifier for providing precise voltages represented by different numbers of bits, as well as the problem of significant layout area increases that may arise from the use of precise capacitances represented by different numbers of bits.
2. Current Idc and time interval sequences may be designed to enable, with a very small area and a very small voltage, continuous adjustability of the amount of charge Qdc within a desired range at a given resolution.
3. Through designing the current Idc sequence as a binary-weighted sequence and the time interval sequence as a sequence with ratios equal to a power of 2, the amount of charge Qdc is adjustable at a resolution of more bits (e.g., 13 or more), and an equivalent capacitance C corresponding to the amount of charge Qdc is adjustable within a range from tens to hundreds of pF.
4. In an ADC application, the ADC does not necessarily have a wide input range.
5. When used in an OLED touch panel for reference subtraction (DC subtraction), through drawing or injecting such an amount of charge from or to sensed charge present on an input electrode of the OLED touch panel by the charge source circuit, the OLED touch panel can have improved reference subtraction and touch detection capabilities.

DETAILED DESCRIPTION

Figure 1:
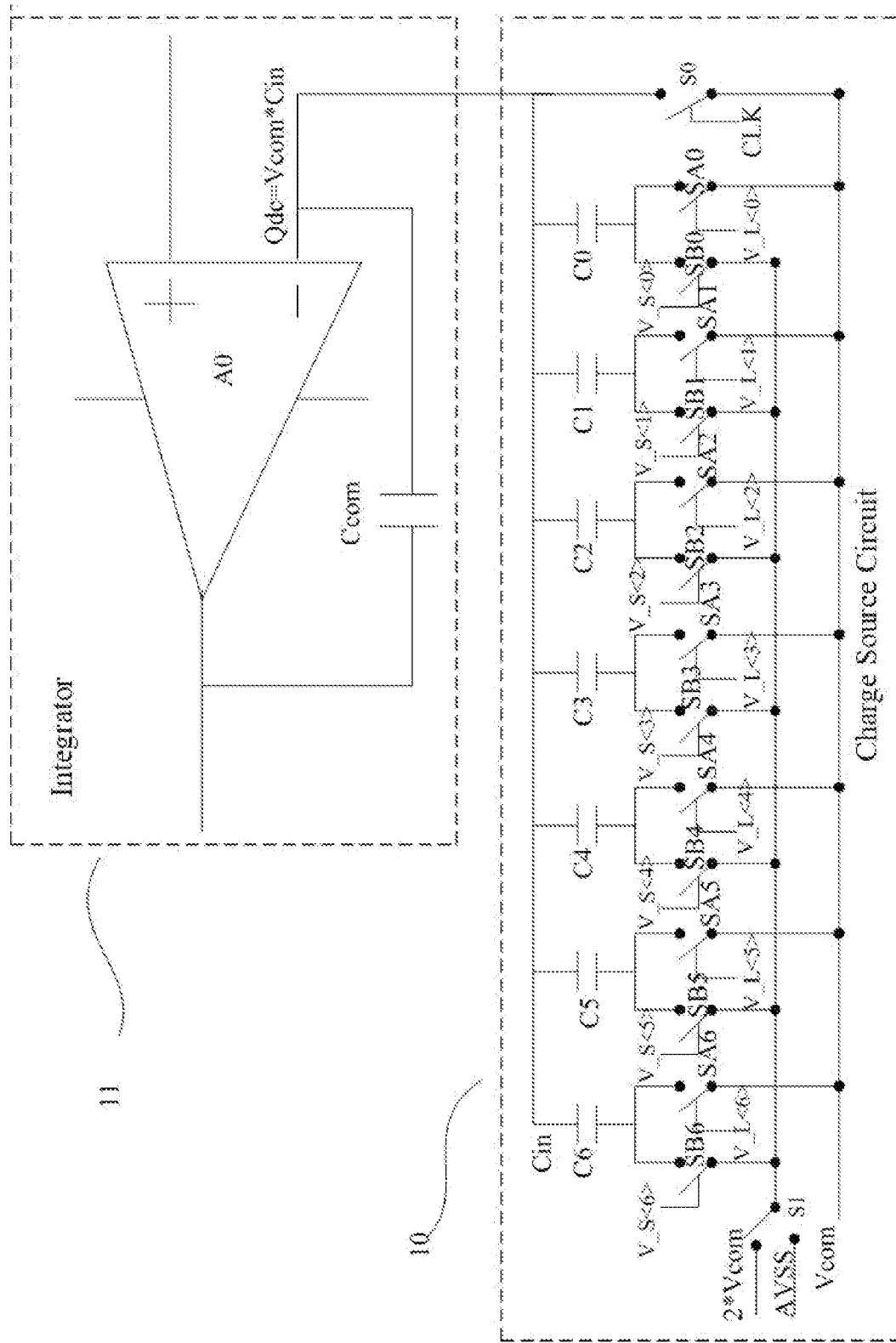
FIG. 1 is a schematic diagram illustrating the structures of a conventional charge source circuit and an ADC incorporating the charge source circuit.

The following description sets forth numerous specific details in order to provide a more thorough understanding of the present invention. However, it will be apparent to those skilled in the art that the present invention can be practiced without one or more of these specific details. In other instances, well-known technical features have not been described in order to avoid unnecessary obscuring of the invention. It is to be understood that the invention may be embodied in many different forms and should not be construed as being limited to the embodiments set forth below. Rather, these embodiments are provided so that this disclosure is thorough and conveys the scope of the invention to those skilled in the art. In the drawings, like reference numerals refer to like elements throughout. It will be understood that when an element is referred to as being "connected to" or "coupled to" another element, it can be directly connected or coupled to the other element, or intervening elements may also be present. In contrast, when an element is referred to as being "directly connected to" another element, there are no intervening elements. As used herein, the singular forms "a", "an" and "the" are intended to include the plural forms as well, unless the context clearly indicates otherwise. It will be further understood that the term "comprising" specifies the presence of stated features, steps, operations, elements, and/or components, but do not preclude the presence or addition of one or more other features, steps, operations, elements, components, and/or groups thereof. As used herein, the term "and/or" includes any and all combinations of the associated listed items.

As described in the Background section, a conventional charge source usually provides an amount of charge according to Qdc=Vcom*Cin.

For example, in organic light-emitting diode (OLED) touch panel applications, touch information is obtained by detecting a variation of a capacitance $C_{finger}$ of a finger or another object that is approaching or has touched a screen of an OLED touch panel (which is a variable ranging from tens of fF to several pF). The detected capacitance $C_{finger}$ is often converted using an analog-to-digital converter (ADC) and adds to a panel capacitance $C_{pannel}$ (which is a fixed value in the range of from several pF to hundreds of pF). Currently, in order to prevent detection of both the finger capacitance $C_{finger}$ and the panel capacitance $C_{pannel}$, the sum of which may exceeds an input range of the ADC, reference subtraction is usually adopted to enable an integrator 11 in the ADC to subtract an amount of charge Qdc induced by the panel capacitance $C_{pannel}$. This can be accomplished by transferring (including injecting or drawing) the amount of charge Qdc into or out from an input electrode of the OLED touch panel by an associated charge source circuit 10 (here, acting as a charge collector).

Specifically, referring to FIG. 1, a conventional analog-to-digital converter for use in an OLED touch panel may include a charge source circuit 10 and an integrator 11. The charge source circuit 10 is typically implemented as an array of n+1 capacitors configured for reference subtraction (DC subtraction) through drawing or injecting an amount of charge Qdc (output from the charge source circuit 10) from or to sensed charge on an input electrode (not shown) of the OLED touch panel.

For example, when n=6, the charge source circuit 10 may include capacitors C0-C6 (making up the capacitor array) and switches SB0-SB6, SA0-SA6, S0-S1. One end of each of the capacitors C0-C6 is coupled to one end of the switch S0, and they are coupled together to an inverting input of the integrator A0, thereby enabling the provision of the amount of charge Qdc for reference subtraction to the integrator A0. The other end of the capacitance C0 is coupled to one end of each of the switches SA0 and SB0. The other end of the capacitance C1 is coupled to one end of each of the switches SA1 and SB1. The other end of the capacitance C2 is coupled to one end of each of the switches SA2 and SB2. The other end of the capacitance C3 is coupled to one end of each of the switches SA3 and SB3. The other end of the capacitance C4 is coupled to one end of each of the switches SA4 and SB4. The other end of the capacitance C5 is coupled to one end of each of the switches SA5 and SB5. The other end of the capacitance C6 is coupled to one end of each of the switches SA6 and SB6. The other ends of all the switches SA0-SA6 and S0 are coupled to a first voltage line Vcom, and the other ends of all the switches SB0-SB6 are coupled to a second voltage line. One end of the second voltage line is coupled to a fixed contact of the switch S1, and a movable contact of the switch S1 is selectively coupled to a second voltage of 2*Vcom or grounded. Control terminals of the switches SB0-SB6 are coupled to respective incoming switching signals V_S<0>-V_S<6>, and control terminals of the switches SA0-SA6 are coupled to respective incoming signals V_L<0>-V_L<6>. A control terminal of the switch S0 is coupled to an incoming clock signal CLK.

Capacitances of the capacitors C0-C6 are binary-weighted. For example, the capacitance of the capacitor C0 is 1*150 fF, the capacitance of the capacitor C1 is 2*150 fF, the capacitance of the capacitor C2 is 4*150 fF, the capacitance of the capacitor C3 is 8*150 fF, the capacitance of the capacitor C4 is 16*150 fF, the capacitance of the capacitor C5 is 32*150 fF, and the capacitance of the capacitor C6 is 64*150 fF. In other words, the capacitance of C1 is twice the capacitance of C0, the capacitance of C2 is twice the capacitance of C1, the capacitance of C3 is twice the capacitance of C2, the capacitance of C4 is twice the capacitance of C3, the capacitance of C5 is twice the capacitance of C4, and the capacitance of C6 is twice the capacitance of C5.

In this circuit, a digital signal output from the analog-to-digital converter (ADC) represents a value Data<6:0> corresponding to the 7-bit switching signals V_S<6:0> and V_L<6:0> of the capacitor array for controlling a value of Cin. As the capacitances of the capacitors C0-C6 are the binary-weighted (64, 32, 16, 8, 4, 2, 1)*150 fF, if the values of the switching signals V_S<6:0> and V_L<6:0> are taken from the range of 111111 to 000000, an overall capacitance Cin can be expressed as N*150 fF, where N is a natural number in the range of 0 to 127.

With this design, Vcom and Cin are required to provide desired resolution which enables the provision of different amounts of charge Qdc for reference subtraction (e.g., from hundreds of pF to tens of fF) represented by various numbers of bits. In order to provide, based on Vcom, precise voltages represented by different numbers of bits, the use of a voltage division technique and a drive operational amplifier is necessary. This, however, will lead to increased circuit complexity and cost. On the other hand, if such high resolution of many bits is to be provided by Cin, the addition of larger capacitances would be necessary. Since adding a capacitance will lead to a proportional increase in layout area, this will obviously lead to significant layout area increases.

In view of this, the present invention provides a novel charge source circuit capable of providing an amount of charge in resolution of 13 or more bits with a very small area and a very small voltage. Moreover, the amount of charge can be adjusted within a range from tens to hundreds of pF, without using too many capacitors which could lead to the problem of an increased circuit layout area. By using this charge source circuit, an analog-to-digital converter can have low power consumption, a small circuit layout area, a wide input range, a high operating speed and high precision. When this charge source circuit is used in an OLED touch panel for reference subtraction (DC subtraction) through drawing or injecting an amount of charge from or to sensed charge on an input electrode of the OLED touch panel, better reference subtraction (DC subtraction) can be achieved for the OLED touch panel.

The present invention will be described in greater detail below with reference to particular embodiments and the accompanying drawings. From the following description, advantages and features of the invention will become more apparent. Note that the figures are provided in a very simplified form not necessarily drawn to exact scale and for the only purpose of facilitating easy and clear description of the embodiments.

Figure 2:
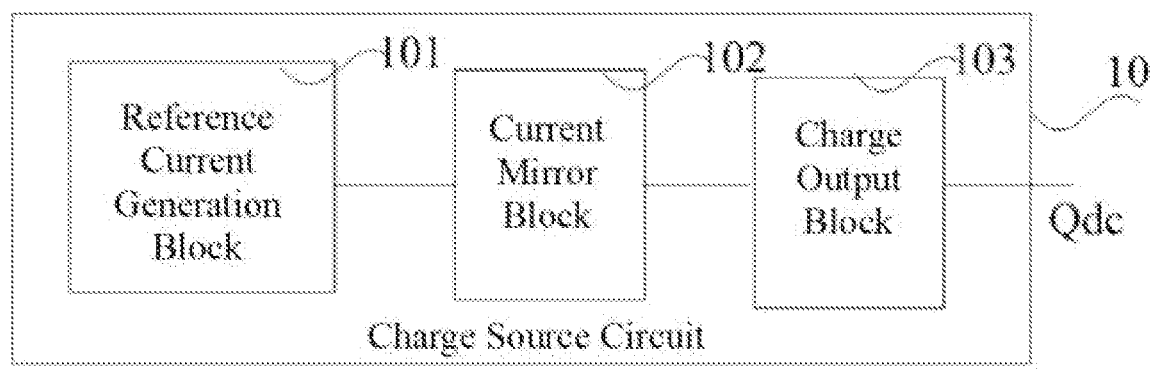
FIG. 2 is a schematic diagram illustrating the structure of a charge source circuit according to an embodiment of the present invention.

Referring to FIG. 2, one embodiment of the present invention provides a charge source circuit 10 including a reference current generation block 101, a current minor block 102 and a charge output block 103, which are connected sequentially in this order.

The reference current generation block 101 is configured to provide a reference current, and the current mirror block 102 is configured to mirror the current from the reference current generation block 101. The charge output block 103 is configured to convert the mirrored current from the current mirror block 102 into a corresponding amount of charge Qdc and output it. The output amount of charge can be expressed as Qdc=Idc*t, where Qdc is the amount of charge output from the charge output block, Idc is a current provided by the charge output block, and t is a period of time in which the charge output block provides the current. The period t is divided into at least two consecutive intervals. Lengths of these time intervals form a sequence with ratios equal to a power of 2, thus enabling continuous adjustability of the amount of charge Qdc.

In this embodiment, the charge output block 103 provides binary-weighted currents Idc in the respective time intervals. Moreover, the period t is divided into n time intervals, depending on the number of bits of a desired range of adjustment of the amount of charge Qdc and a maximum possible number of bits of the current in each time interval (i.e., a maximum possible range of adjustment of the current in each time interval).

Specifically, it is assumed that the maximum possible range of adjustment of the current Idc in each time interval provided by the charge output block corresponds to k bits (i.e., the maximum possible number of bits of the current in each time interval is k) and that the desired range of adjustment of the amount of charge Qdc corresponds to M bits, where M≥k+1.

If M is divisible by k, then the number of time intervals n of the period t satisfies n=M/k. In this way, a fixed number of time intervals (n) are set for the desired M-bit amount of charge Qdc, and the current Idc in each time interval is adjustable within a k-bit range. Thus, an amount of charge Qdc in each time interval can also be adjusted within a k-bit range.

If M is indivisible by k, then the number of time intervals n of the period t satisfies n=int(M/k)+1. In this way, a fixed number of time intervals (n) are also set for the desired M-bit amount of charge Qdc. In this case, an amount of charge Qdc in each of the first n-1 time intervals is adjustable within a k-bit range, while an amount of charge Qdc in the last time interval can be adjusted within a M-(n-1)*k-bit range. Here, int ( ) denotes a floor function which rounds a number down to the nearest integer, rather than to the nearest integer.

It is to be noted that in order to achieve continuous adjustability of the amount of charge Qdc, between any two consecutive time intervals of the n time intervals, the difference between a minimum possible amount of charge Qdc in the first time interval and a maximum possible amount of charge Qdc in the second time interval is equal to a minimum resolvable amount of charge Qdc.

In addition, in order to shorten the total period t, the n time intervals form a chronological sequence and their lengths form a progression with a common ratio equal to a negative power of 2. Between any two consecutive time interval of the n time intervals, the length of the earlier time interval is p times (p=$2^q$, i.e., the q-th power of 2) the length of the later time interval. Moreover, a minimum possible value of the current provided in the earlier time interval is greater than a maximum possible value of the current Idc provided in the later time interval. Thus, the a more significant bit of the amount of charge Qdc can be adjusted in the earlier time interval, and a less significant bit of the amount of charge Qdc can be adjusted in the later time interval.

Figure 5:
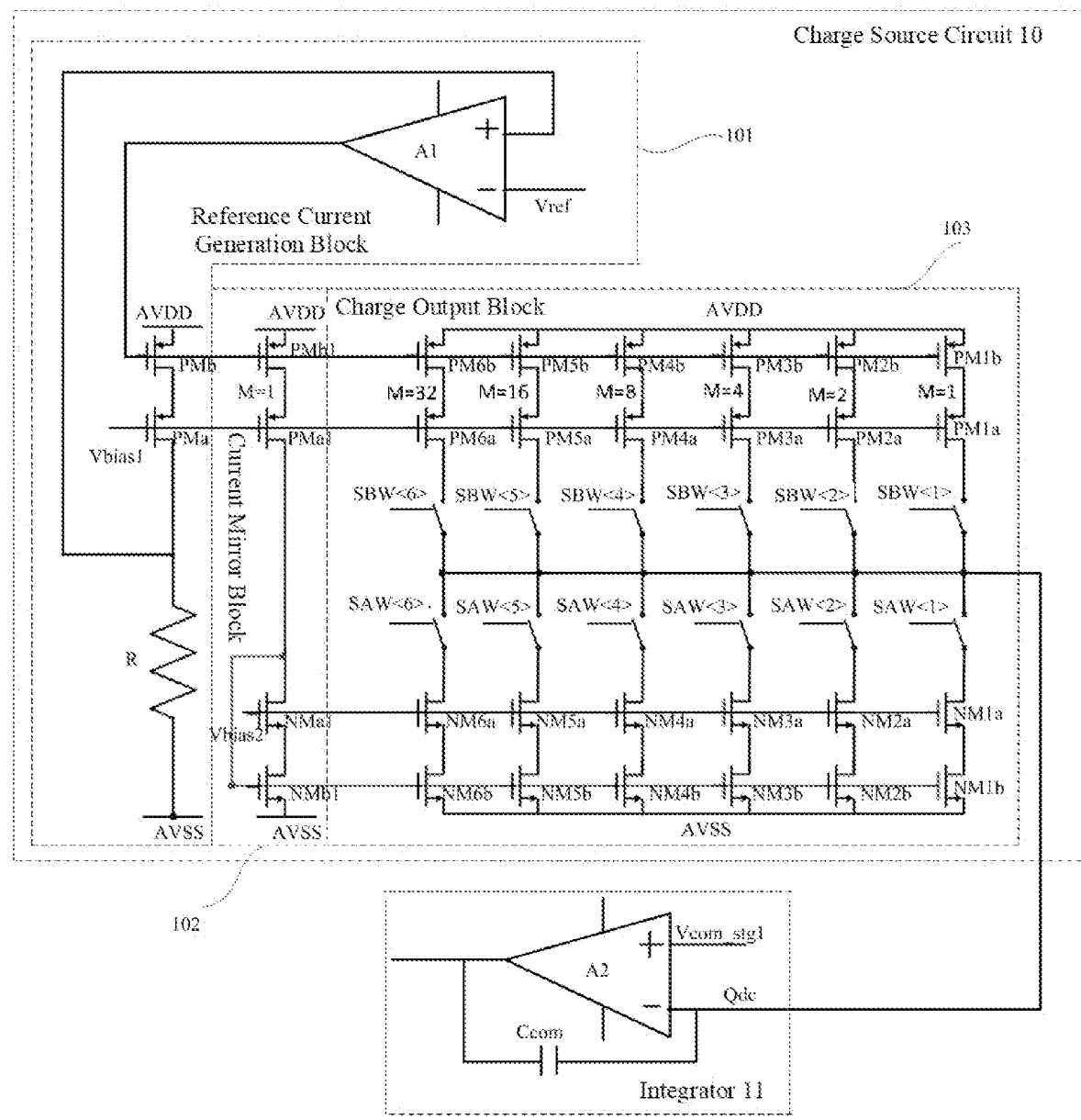
FIG. 5 is a schematic diagram illustrating the structure of a specific exemplary implementation of the charge source circuit of FIG. 2.

In this embodiment, for the purpose of circuit layout area savings, with additional reference to FIG. 5, both the current mirror block 102 and the charge output block 103 are circuits not containing a capacitor. Instead, they are constructed essentially from transistors such as MOS transistors. The charge output block 103 includes k current source branches, where k≥2. In order to enable bidirectional output of Qdc from the charge output block 103, each of the current source branches includes an upper current source, an upper control switch SBW, a lower control switch SAW and a lower current source, which are connected sequentially in this order. The upper current sources and the upper control switches control current drawing of the k current source branches, while the lower current sources and the lower control switches control current injection of the k current source branches. Control terminals of the upper and lower current sources are coupled to the current mirror block 102. Upper terminals of the upper current sources are coupled to an operating voltage AVDD, and lower terminals of them are grounded AVSS. The charge output block 103 controls an output of each of the k current source branches through turning on or off the corresponding upper control switch SBW or lower control switch SAW, thereby enabling binary weighting of output currents Idc in different time intervals. The upper current sources are input nodes where the current Idc flows into an integrator A2 in the next stage. Under the control of a k-bit switching signal SBW<k:1>, a current Idc=Nb*I0 can be produced, where Nb is a k-bit binary value ranging from 0 to ($2^k$-1), and I0 is the mirrored current from the current minor block 101 (i.e., a unit current). The lower current sources are input nodes where the current Idc flows out of the integrator A2 in the next stage. Under the control of a k-bit switching signal SAW<6:1>, a current Idc=Na*I0 can be produced, where Na is also a k-bit binary value in ranging from 0 to ($2^k$-1).

Figure 3:
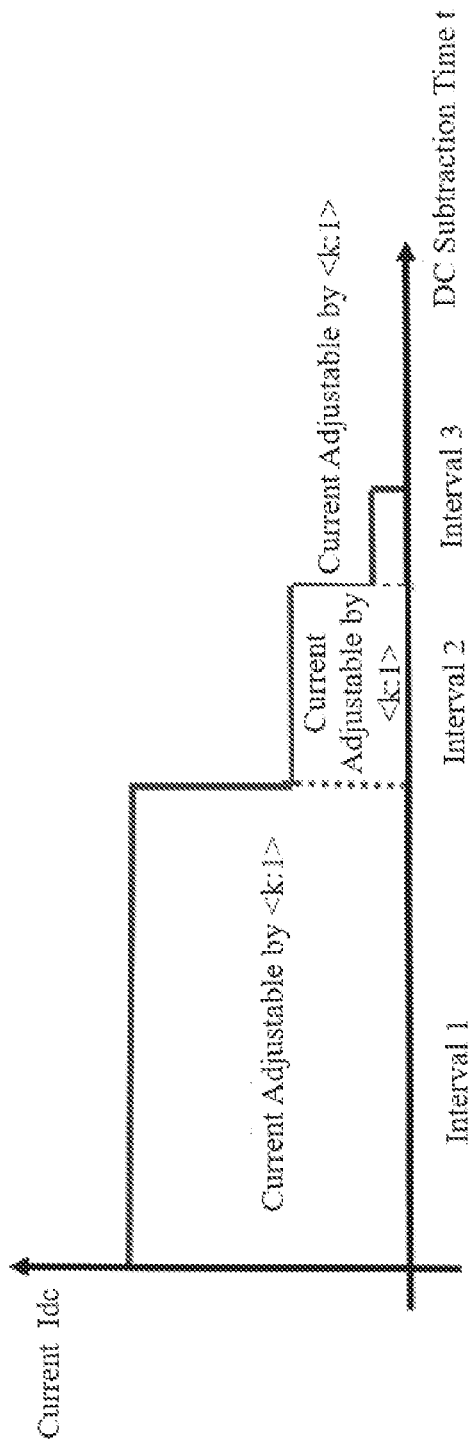
FIG. 3 is an exemplary line chart showing variation of a current from the charge source circuit of FIG. 2 over time intervals.

As an example, referring to FIG. 3, if a maximum possible number of bits of the current Idc provided in each time interval is k and the number of bits M of the desired amount of charge Qdc satisfies M=3k, then the period t can be divided into 3 consecutive time intervals (i.e., n=3) for the charge output block 103: Interval 1, Interval 2 and Interval 3. In this case, in each of the time intervals, the charge output block 103 outputs an amount of charge Qdc=Idc*t, and Idc can be adjusted within a k-bit range in each time interval of Intervals 1-3. Specifically, the upper control switches SBW are controlled by the k-bit switching signal SBW<k:1>, and the lower control switches SAW are controlled by the k-bit switching signal SAW<k:1>. When the length t3 of Interval 3 is configured to equal that of a unit interval of the system, i.e., the reciprocal of the system frequency, 1/f, it can be used to control the least significant k bits of the amount of charge Qdc. The length of Interval 2 can be configured to be $2^k$ times that of Interval 3. Thus, when k=6, it is equal to 64/f, and this interval can be used to control the intermediate significant k bits of the amount of charge Qdc. The length of Interval 1 can be configured to be $2^k$ times that of Interval 2. Thus, when k=6, it is equal to 64*64/f, and this interval can be used to control the most significant k bits of the amount of charge Qdc. In this way, the amount of charge Qdc can be controlled with a total of M=3k bits. Moreover, the difference between a minimum possible amount of charge Qdc provided in Interval 1 (as a minimum possible value of Idc in this internal is I0, the minimum possible amount of charge Qdc provided in Interval 1 is I0*t1) and a maximum possible amount of charge Qdc provided in Interval 2 (e.g., if k=6, then a maximum possible value of Idc in this internal is $(2^5+2^4+2^3+2^2+2^1+2^0)*I0=63*I0$, and the maximum possible amount of charge Qdc provided in Interval 2 is 63*I0*t2) is equal to a minimum resolvable amount of charge Qdc for Interval 2, i.e., I0*t2. Thus, when the length of Interval 1 is configured to be 64 times that of Interval 2, i.e., t1=64*t2, continuous adjustability of the amount of charge Qdc can be achieved throughout the period of time consisting of Intervals 1 and 2. Further, the difference between a minimum possible amount of charge Qdc provided in Interval 2 (as a minimum possible value of Idc in this internal is I0, the minimum possible amount of charge Qdc provided in Interval 2 is I0*t2) and a maximum possible amount of charge Qdc provided in Interval 3 (e.g., if k=6, then similarly, a maximum possible value of Idc in this internal is 63*I0, and the maximum possible amount of charge Qdc provided in Interval 3 is 63*I0*t3) is equal to a minimum resolvable amount of charge Qdc for Interval 3, i.e., I0*t3. Thus, if k=6, when the length of Interval 2 is configured to be 64 times that of Interval 3, i.e., t2=64*t3, continuous adjustability of the amount of charge Qdc can be achieved throughout the period of time consisting of Intervals 2 and 3. As noted above, t3 is configured to be equal to the system's unit interval.

Figure 4:
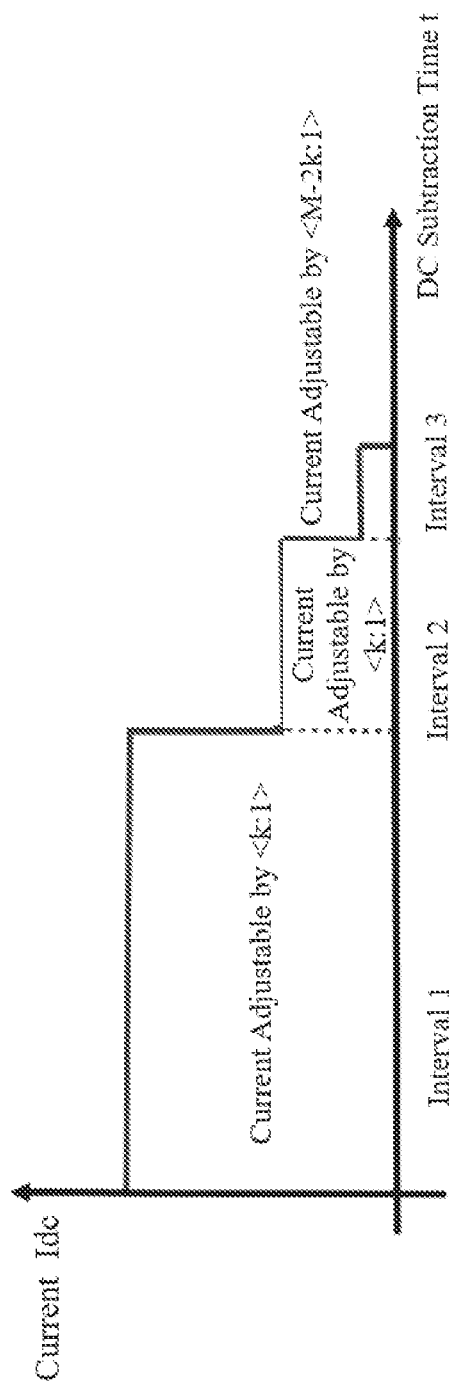
FIG. 4 is another exemplary line chart showing variation of a current from the charge source circuit of FIG. 2 over time intervals.

As an example, referring to FIG. 4, if a maximum possible number of bits of the current Idc provided in each time interval is k and the number of bits M of the desired amount of charge Qdc satisfies 2k<M<3k, then the period t can be divided into 3 consecutive time intervals (i.e., n=3) for the charge output block 103: Interval 1, Interval 2 and Interval 3. In this case, in each of the time intervals, the charge output block 103 outputs an amount of charge Qdc=Idc*t. Moreover, the current Idc can be adjusted in a k-bit range in both Intervals 1 and 2 but in a (M-2k)-bit range in Interval 3. When the length t3 of Interval 3 is configured to equal that of the unit interval of the system, i.e., the reciprocal of the system frequency, 1/f, it can be used to control the least significant (M-2k) bits of the amount of charge Qdc. The length of Interval 2 can be configured to be $2^{(M-2K)}$ times that of Interval 3. Thus, when k=6, it is equal to 4/f, and this interval can be used to control the intermediate significant k bits of the amount of charge Qdc. The length of Interval 1 can be configured to be $2^k$ times that of Interval 2. Thus, when k=6, it is equal to 64*64/f, and this interval can be used to control the most significant k bits of the amount of charge Qdc. In this way, the amount of charge Qdc can be controlled with a total of M bits. Additionally, the difference between a minimum possible amount of charge Qdc provided in Interval 1 and a maximum possible amount of charge Qdc provided in Interval 2 is equal to a minimum resolvable amount of charge Qdc for Interval 2, i.e., I0*t2. Further, the difference between a minimum possible amount of charge Qdc provided in Interval 2 and a maximum possible amount of charge Qdc provided in Interval 3 is equal to a minimum resolvable amount of charge Qdc for Interval 3, i.e., I0*t3. In this way, continuous adjustability of the amount of charge Qdc can be achieved throughout the period of time consisting of Intervals 1 through 3.

Only unidirectional output of charge Qdc from the charge output block 103 may be needed (e.g., to be drawn or injected from or to sensed charge on the input electrode of the OLED touch panel for reference subtraction). When it is only needed to draw the amount of charge from the sensed charge, only the lower current sources and the lower control switches will be necessary, and the upper current sources and the upper control switches may be omitted. On the contrary, when it is only needed to inject the amount of charge to the sensed charge, only the upper current sources and the upper control switches will be necessary, and the lower current sources and the lower control switches may be omitted.

It is to be noted that, in this embodiment, the lengths of the time intervals (e.g., Interval 1, Interval 2 and Interval 3, as described above) are fixed and not involved in the adjustment of the amount of charge Qdc. They may be determined in advance according to the desired range and resolution of adjustment of the amount of charge Qdc. Therefore, in this embodiment, different amounts of charge Qdc represented by various numbers of bits can be provided through adjusting the values of Na and Nb in the various time intervals.

Moreover, the number of time intervals and the lengths thereof are so configured that an amount of charge Qdc is first output over a longer period of time determined by the most significant bits and another amount of charge Qdc is then output over a shorter period of time determined by the rest less significant bits. In this way, a desired total amount of charge Qdc can be output within an overall short period of time at an increased output speed. In particular, when the charge source circuit of this embodiment is used in an analog-to-digital converter, the analog-to-digital converter can have a faster processing speed, and when it is used in an OLED touch panel, the OLED touch panel can be capable of faster touch detection.

Additionally, it is to be understood that the time intervals that form a sequence with ratios equal to a power of 2 and the binary-weighted currents are merely examples of the present invention, which do not limit the scope of the invention in any way. In other embodiments of the present invention, sequence with other ratios not equal to 2 and non-binary-weighted currents Idc are also possible. Further, the reference current generation block 101, the current minor block 102 and the charge output block 103 may be implemented as any suitable circuit designs, as long as they can perform the functions of the charge source circuit described herein.

As an example, the reference current generation block 101 may be a constant-current source capable of outputting a constant current.

As another example, referring to FIG. 5, the reference current generation block 101 may include an operational amplifier A1, a first switching transistor PMb, a second switching transistor PMa and a resistor R. Both the first switching transistor PMb and the second switching transistor PMa may be PMOS transistors. A source of the first switching transistor PMb is coupled to the operating voltage AVDD, and a drain of the first switching transistor PMb is coupled to the source of the first switching transistor PMb. A drain of the second switching transistor PMa is coupled to one end of the resistor R and a non-inverting (+) input of the operational amplifier A1, and the other end of the resistor R is grounded. An inverting (−) input of the operational amplifier A1 receives a reference voltage Vref, and a gate of the first switching transistor PMb is coupled to an output of the operational amplifier A1. A first bias voltage signal Vbias1 is applied to a gate of the second switching transistor PMa. When the first switching transistor PMb and the second switching transistor PMa are both turned on, the reference current generation block 101 can produce a constant current I0=Vref/R through the resistor R.

The current minor block 102 may include an upper primary minor transistor PMb1, an upper cascaded transistor PMa1, a lower cascaded transistor NMa1 and a lower primary minor transistor NMb1. A source of the upper primary minor transistor PMb1 is coupled to the operating voltage AVDD, and a drain of the upper primary minor transistor PMb1 is coupled to a source of the upper cascaded transistor PMa1. A drain of the upper cascaded transistor PMa1 is coupled to a drain of the lower cascaded transistor NMa1. A source of the lower cascaded transistor NMa1 is coupled to a drain of the lower primary minor transistor NMb1, and a source of the lower primary minor transistor NMb1 is grounded AVSS. A gate of the upper primary minor transistor PMb1 is coupled to the gate of the first switching transistor PMb and the output of the operational amplifier A1, and the first bias voltage signal Vbias1 is provided at the gate of the upper cascaded transistor PMa1. A second bias voltage signal Vbias2 is provided at a gate of the lower cascaded transistor NMa1, and a gate of the lower primary minor transistor NMb1 is coupled to a node where the upper cascaded transistor PMa1 is coupled to the lower cascaded transistor NMa1 and to the current source branches in the charge output block 103 (e.g., to gates of second lower transistors therein).

The upper primary mirror transistor PMb1 has a size defined as M=1 and can minor a current TO through the first switching transistor PMb at a ratio of 1:1.

The charge output block 103 can bidirectionally output an amount of charge Qdc and may include 6 current source branches, i.e., k=6. Each current source branch may include an upper current source, an upper control switch SBW, a lower control switch SAW and a lower current source, which are connected sequentially in this order. Moreover, the upper current source may include a first upper transistor and a second upper transistor, and the lower current source may include a first lower transistor and a second lower transistor.

Specifically, the first current source branch may include a first upper transistor PM1b, a second upper transistor PM1a, an upper control switch SBW under the control of a switching signal SBW<1>, a lower control switch SAW under the control of a switching signal SAW<1>, a first lower transistor NM1a and a second lower transistor NM1b. The second current source branch may include a first upper transistor PM2b, a second upper transistor PM2a, an upper control switch SBW under the control of a switching signal SBW<2>, a lower control switch SAW under the control of a switching signal SAW<2>, a first lower transistor NM2a and a second lower transistor NM2b. The third current source branch may include a first upper transistor PM3b, a second upper transistor PM3a, an upper control switch SBW under the control of a switching signal SBW<3>, a lower control switch SAW under the control of a switching signal SAW<3>, a first lower transistor NM3a and a second lower transistor NM3b. The fourth current source branch may include a first upper transistor PM4b, a second upper transistor PM4a, an upper control switch SBW under the control of a switching signal SBW<4>, a lower control switch SAW under the control of a switching signal SAW<4>, a first lower transistor NM4a and a second lower transistor NM4b. The fifth current source branch may include a first upper transistor PM5b, a second upper transistor PM5a, an upper control switch SBW under the control of a switching signal SBW<5>, a lower control switch SAW under the control of a switching signal SAW<5>, a first lower transistor NM5a and a second lower transistor NM5b. The sixth current source branch may include a first upper transistor PM6b, a second upper transistor PM6a, an upper control switch SBW under the control of a switching signal SBW<6>, a lower control switch SAW under the control of a switching signal SAW<6>, a first lower transistor NM6a and a second lower transistor NM6b.

In the first current source branch, a drain of the first upper transistor PM1b is coupled to a source of the second upper transistor PM1a, and a drain of the second upper transistor PM1a is coupled to one end of the upper control switch in the branch. A drain of the first lower transistor NM1a is coupled to one end of the lower control switch in the branch, and the drain and a source of the first lower transistor NM1a are coupled to a drain of the second lower transistor NM1b. A source of the second lower transistor NM1b is grounded.

The transistors and control switches in each of the second to sixth current source branches are wired in the same manner as those in the first current source branch, and detailed description thereof is omitted herein.

Further, gates of the first upper transistors PM1b-PM6b may be coupled together and to both the gate of the upper primary mirror transistor PMb1 and the output of the operational amplifier A1. Gates of the second upper transistors PM1a-PM6a may be coupled together and to the first bias voltage signal Vbias 1. Gates of the first lower transistors NM1a-NM6a may be coupled together and to the second bias voltage signal Vbias2. Gates of the second lower transistors NM1b-NM6b may be coupled together and to the gate of the lower primary mirror transistor NMb1.

It is to be noted that sizes of the first upper transistors PM1b-PM6b are binary-weighted. That is, the size M of the first upper transistor PM1b is 1, the same as the size of the upper primary mirror transistor PMb1. The size M of the first upper transistor PM2b is 2, twice the size of the first upper transistor PM1b. The size M of the first upper transistor PM3b is 4, twice the size of the first upper transistor PM2b. The size M of the first upper transistor PM4b is 8, twice the size of the first upper transistor PM3b. The size M of the first upper transistor PM5b is 16, twice the size of the first upper transistor PM4b. The size M of the first upper transistor PM6b is 32, twice the size of the first upper transistor PM5b.

Sizes of the second lower transistors NM1b-NM6b are also binary-weighted. That is, the size M of the second lower transistor NM1b is 1, the same as the size of the lower primary mirror transistor NMb1. The size M of the second lower transistor NM2b is 2, twice the size of the second lower transistor NM1b. The size M of the second lower transistor NM3b is 4, twice the size of the second lower transistor NM2b. The size M of the second lower transistor NM4b is 8, twice the size of the second lower transistor NM3b. The size M of the second lower transistor NM5b is 16, twice the size of the second lower transistor NM4b. The size M of the second lower transistor NM6b is 32, twice the size of the second lower transistor NM5b.

It is to be noted that, apart from the binary-weighted sizes of the first upper transistors PM1b-PM6b and the second lower transistors NM1b-NM6b, binary weighting of mirrored currents from the 6 current source branches can also be accomplished by parallel transistors (e.g., for each type of transistor, the M=2 branch may include two parallel replicas of the transistor in the M=1 branch).

Further, the second switching transistor PMa, the first switching transistor PMb, the first upper transistors, the second upper transistors, the upper primary mirror transistor PMb1 and the upper cascaded transistor PMa1 may all be PMOS transistors, while the lower cascaded transistor NMa1, the lower primary mirror transistor NMb1, the first lower transistors and the second lower transistors may all be NNOS transistors. Of course, in other embodiments of the present invention, these MOS transistors may be replaced with bipolar transistors, triodes or other suitable switching elements.

Furthermore, the second upper transistors are cascaded to the respective first upper transistors, and the first lower transistors are cascaded to the respective second lower transistors. The second switching transistor PMa is cascaded to the first switching transistor PMb, and the upper cascaded transistor PMa1 is cascaded to the upper primary mirror transistor PMb1. The lower cascaded transistor NMa1 is cascaded to the lower primary mirror transistor NMb1. These cascaded transistors are provided to enhance load-carrying and current output capabilities, reduce output impedance, avoid compromised current or voltage gains and prevent output distortion, of the branches.

In this example, in each current source branch in the charge output block 103, the cascaded first and second upper transistors make up an upper current mirror (in other embodiments, each upper current mirror may also be made up of more cascaded PMOS transistors), which provides a current that flows to the inverting input of the integrator A2 and charges the integrator A2. Thus, when all the first and second lower transistors are turned off by the switching signal SAW<6:1>, the number Nb of upper current minors that provide currents to the integrator A2 can be adjusted by turning on or off the individual upper control switches under the control of the switching signal SBW<6:1>. The overall current Idc that flows to the inverting input of the integrator A2 is Nb*I0 and can inject to the integrator A2 an amount of charge Qdc that is equal to Idc*t=Nb*I0*t. Nb is 6-bit binary. When the switching signal SBW<6:1> is 111111, Nb takes a maximum value of $32+16+8+4+2+1=2^6-1=63$. When the switching signal SBW<6:1> is 000000, Nb takes a minimum value of 0. Therefore, the value of Nb ranges from 0 to 63.

Notably, in case of the charge source circuit 10 to be used for reference subtraction in an OLED touch panel, since a capacitance $C_{pannel}$ of the touch panel typically has been determined before delivery, an amount of charge Qdc=Idc*t required to be drawn or injected for reference subtraction can be determined based on the panel capacitance $C_{pannel}$. The period t may be controlled by a value stored in a control register in a processor (e.g., an MCU, not shown), and the current Idc can be determined by the processor through configuring the values of Na and Nb by turning on or off the individual upper and lower control switches SBW, SAW.

Figure 6:
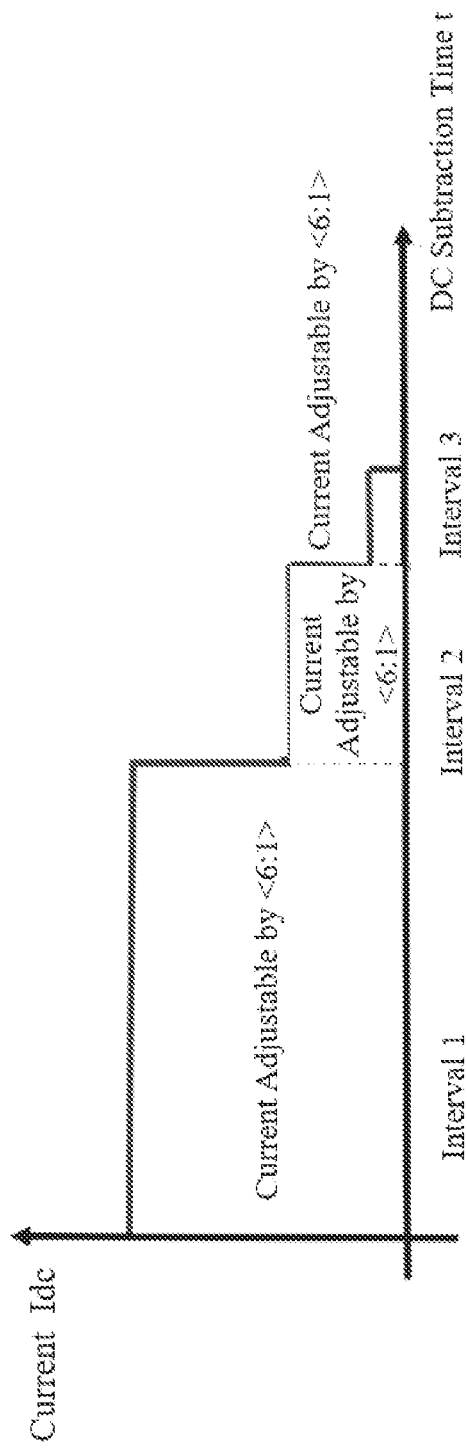
FIG. 6 is an exemplary line chart showing variation of a current from the charge source circuit of FIG. 5 over time intervals.

In this example, assuming a range of adjustment of Qdc with a resolution of 18 bits (i.e., M=18) is desired, with additional reference to FIG. 6, with all the lower current minors being turned off (i.e., no current is output from them) under the control of the switching signal SAW<6:1>, the period tin which the integrator A2 is charged by currents from the individual upper current minors under the control of the switching signal SBW<6:1> is divided into n=M/k=18/6=3 consecutive time intervals: Interval 1 (with a length of time of t1), Interval 2 (with a length of t2) and Interval 3 (with a length of t3). In each of the time intervals, a current Idc provided by the charge output block 103 can be controlled with 6 bits.

Here, the lowest current in Interval 3 is denoted as $I_{min}$ and the length of the interval is configured to be equal to a length of the system's unit interval. That is, t3 is equal to the reciprocal of the system frequency f, i.e., 1/f. Moreover, the length of Interval 2 is configured to be 64 times that of Interval 3 (i.e., t2=64/f) and the length of Interval 1 is configured to be 64 times that of Interval 2 (i.e., t1=64*64/f). The length of Interval 3 determines a minimum resolvable amount of charge to be charged to the integrator A2 for reference subtraction, i.e., $Qdc=I0*t3=I_{min}*1/f$. An equivalent minimum capacitance $C_{EM}$ is $(I_{min}*1/f)/Vin$, where Vin represents an input voltage.

Therefore, a total amount of charge charged into the integrator A2 by the individual upper current minors under the control of the switching signal SBW<6:1>can be expressed as:

$$Qdc=Qdc1_{(Interval\ 1)}+Qdc2_{(Interval\ 2)}+Qdc3_{(Interval\ 3)}$$

$$=Nb1_{(Interval\ 1)}*I0*t1+Nb2_{(Interval2)}*I0*t2+Nb3_{(Interval3)}*I0*t3$$

$$=\{64*64*Nb1_{(Interval\ 1)}+64*Nb2_{(Interval\ 2)}+Nb3_{(Interval\ 3)}\}I*I0*t3.$$

$Nb1_{(Interval\ 1)}$ represents a Nb value indicated by the SBW<6:1> in Interval 1. $Nb1_{(Interval\ 1)}$ is a 6-bit binary value taken from the range of 0-63. In Interval 1, the most significant 6 bits of the amount of charge Qdc can be controlled by $Nb1_{(Interval\ 1)}$. $Nb2_{(Interval\ 2)}$ represents a Nb value indicated by the SBW<6:1> in Interval 2. $Nb2_{(Interval\ 2)}$ is also a 6-bit binary value taken from the range of 0-63. In Interval 2, the intermediate significant 6 bits of the amount of charge Qdc can be controlled by $Nb2_{(Interval\ 2)}$. $Nb3_{(Interval\ 3)}$ represents a Nb value indicated by the SBW<6:1> in Interval 3. $Nb3_{(Interval\ 3)}$ is also a 6-bit binary value taken from the range of 0-63. In Interval 3, the least significant 6 bits of the amount of charge Qdc can be controlled by $Nb3_{(Interval\ 3)}$.

In this way, an overall Qdc amount over the three time intervals can be controlled with 18 bits, and an equivalent capacitance $C_E$ adjustable within the range of from 0 to $C_{EM}*2^{18}$ can be provided. When $C_{EM}$ lies between fifty and sixty fF, the equivalent capacitance $C_E$ corresponding to the 18-bit Qdc amount can address needs ranging from several pF to hundreds of pF. Moreover, the time intervals and currents are designed to enable Qdc in the three time intervals to be controlled with a continuous sequence of bits. Specifically, Qdc3 in Interval 3 can be adjusted by adjusting Nb3 that is represented by the least significant 6 bits and ranges from 0 to 63. Therefore, Qdc3 in this interval has a minimum value of 0 (when Nb3 is at its minimum value that is 0) and a maximum value of 63*I0*t3 (when Nb3 is at its maximum value that is 63). Qdc2 in Interval 2 can be adjusted by adjusting Nb2 that is represented by the intermediate significant 6 bits and ranges from 0 to 63. Therefore, Qdc2 in this interval has a minimum value of 64*I0*t3 when Nb2 is 1. The difference between the minimum Qdc2 value in Interval 2 and the maximum Qdc3 value in Interval 3 is just equal to the minimum resolvable Qdc value for Interval 3 that is I0*t3. This enables Qdc in Intervals 2 and 3 to be overall controlled with a continuous sequence of bits. Qdc2 in Interval 2 has a minimum value of 64*63*I0*t3 when Nb2 is 63. Qdc1 in Interval 1 can be adjusted by adjusting Nb1 that is represented by the most significant 6 bits and ranges from 0 to 63. Qdc1 in this interval has a minimum value of 64*64*I0*t3 when Nb1 is 1. The difference between the minimum Qdc1 value in Interval 1 and the maximum Qdc2 value in Interval 2 is just equal to the minimum resolvable Qdc value for Interval 2 that is 64*I0*t3. This enables Qdc in Intervals 1 and 2 to be overall controlled with a continuous sequence of bits.

Figure 7:
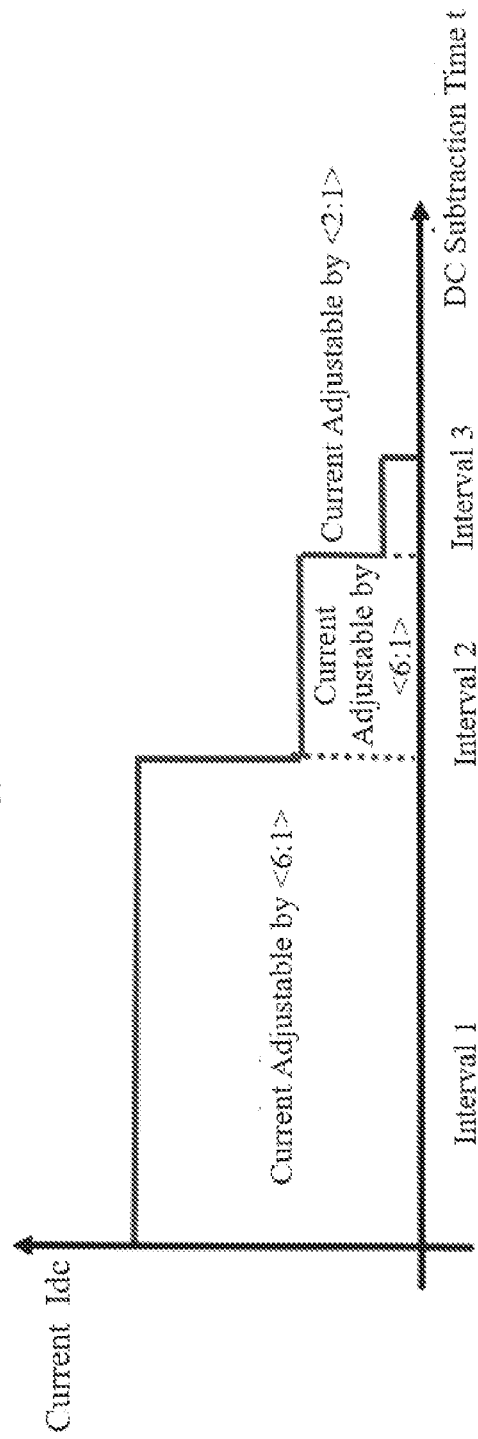
FIG. 7 is another exemplary line chart showing variation of a current from the charge source circuit of FIG. 5 over time intervals.

In practical applications, a resolution of 14 bits (i.e., M=14) may suffice, and a shorter total time taken to provide a given amount of charge would be desirable (i.e., a reference subtraction time of an ADC). In this case, the charge source circuit design of FIG. 5 can still be used with assumption that k=6. With additional reference to FIG. 7, in such applications, with all the lower current mirrors being turned off (i.e., there is no current flowing into or out of them) under the control of the switching signal SAW<6:1>, the period t in which the integrator A2 is charged by currents from the individual upper current mirrors under the control of the switching signal SBW<6:1> is divided into n=int(M/k)+1=int (14/6)+1=2+1=3 consecutive time intervals: Interval 1 (with a length of t1), Interval 2 (with a length of t2) and Interval 3 (with a length of t3). The length of Interval 3 is configured to be equal to a length of the system's unit interval (i.e., t3 is equal to the reciprocal of the system frequency f, i.e., 1/f). Moreover, the length of Interval 2 is configured to be 4 times that of Interval 3 (i.e., t2=4/f), and the length of Interval 1 is configured to be 64 times that of Interval 2 (i.e., t1=64*4/f). Further, in Interval 3, the switching signal SBW<2:1> is used to control the individual upper current minors to charge the integrator A2, while in both Intervals 1 and 2, the switching signal SBW<6:1> is used to control the individual upper current minors to charge the integrator A2. A total amount of charge charged in the period can be expressed as:

$$Qdc=Qdc1_{(Interval\ 1)}+Qdc2_{(Interval\ 2)}+Qdc3_{(Interval\ 3)}$$

$$=Nb1_{(Interval\ 1)}*I0*t1+Nb2_{(Interval\ 2)}*I0*t2+Nb3_{(Interval\ 3)}*I0*t3$$

$$=\{64*4*Nb1_{(Interval\ 1)}4*Nb2_{(Interval\ 2)}+Nb3_{(Interval\ 3)}\}I*I0*t3.$$

$Nb1_{(Interval\ 1)}$ represents a Nb value indicated by the SBW<6:1> in Interval 1. $Nb1_{(Interval\ 1)}$ is a 6-bit binary value taken from the range of 0-63. In Interval 1, the most significant 6 bits of the amount of charge Qdc can be controlled by $Nb1_{(Interval\ 1)}$. $Nb2_{(Interval\ 2)}$ represents a Nb value indicated by the SBW<6:1> in Interval 2. $Nb2_{(Interval\ 2)}$ is also a 6-bit binary value taken from the range of 0-63. In Interval 2, the intermediate significant 6 bits of the amount of charge Qdc can be controlled by $Nb2_{(Interval\ 2)}$. $Nb3_{(Interval\ 3)}$ represents a Nb value indicated by the SBW<2:1> in Interval 3. $Nb3_{(Interval\ 3)}$ is a 2-bit binary value taken from the range of 0-3. In Interval 3, the least significant 2 bits of the amount of charge Qdc can be controlled by $Nb3_{(Interval\ 3)}$. That is, in both Intervals 1 and 2, an amount of charge Qdc adjustable in a 6-bit (k=6) range can be provided, while in Interval 3, an amount of charge Qdc adjustable in a 2-bit (M−(n−1)*k=14−2*6=2) range can be provided. In this way, an overall Qdc amount over the three time intervals can be controlled with 14 bits. Moreover, when the Nb3 takes the maximum value of 3, a maximum Qdc3 value is achieved in Interval 3, which is equal to 3*I0*t3. When Nb2 takes 1, a minimum Qdc2 value is provided in Interval 2, which is equal to 4*I0*t3. The difference between the minimum Qdc2 value provided in Interval 2 and the maximum Qdc3 value provided in Interval 3 is just equal to the minimum resolvable Qdc value for Interval 3, i.e., I0*t3. This enables Qdc in Intervals 2 and 3 to be overall controlled with a continuous sequence of bits. When Nb2 takes 63, the intermediate significant bits in Interval 2 provides a maximum Qdc2 value that is equal to 4*63*I0*t3, and when Nb1 takes 1, a minimum Qdc1 value equal to 64*4*I0*t3 is provided. The difference between the minimum Qdc1 value provided in Interval 1 and the maximum Qdc2 value provided in Interval 2 is just equal to the minimum resolvable Qdc value for Interval 2, i.e., 4*I0*t3. This enables Qdc in Intervals 1 and 2 to be overall controlled with a continuous sequence of bits.

Likewise, in this example, in each current source branch of the charge output block 103, the cascaded first and second first and second lower transistors make up a lower current minor, which provides a current that flows out of the inverting input of the integrator A2 and discharges the integrator A2. Thus, when all the first and second upper transistors are turned off by the switching signal SBW<6:1>, the number Na of lower current minors that provide currents from the integrator A2 can be adjusted by turning on or off the individual lower control switches under the control of the switching signal SAW<6:1>. The overall current Idc that flows from the inverting input of the integrator A2 is Na*I0 and can draw from the integrator A2 an amount of charge Qdc that is equal to Idc*t=Na*I0*t. Na is 6-bit binary. When the switching signal SAW<6:1> is 111111, Nb takes a maximum value of $32+16+8+4+2+1=2^6-1=63$. When the switching signal SAW<6:1> is 000000, Na takes a minimum value of 0. Therefore, the value of Nb ranges from 0 to 63.

In this example, assuming an range of adjustment of Qdc with a resolution of 18 bits (i.e., M=18) is desired, with additional reference to FIG. 6, with all the upper current minors being turned off (i.e., there is no current flowing into or out of them) under the control of the switching signal SBW<6:1>, the period t in which the integrator A2 is discharged by currents from the individual low current mirrors under the control of the switching signal SAW<6:1> is also divided into 3 (i.e., n=M/k=18/6=3) consecutive time intervals: Interval 1 (with a length of t1), Interval 2 (with a length of t2) and Interval 3 (with a length of t3). In each of the time intervals, a current Idc provided by the charge output block 103 can be controlled with 6 bits.

Here, the lowest current in Interval 3 is denoted as $I_{min}$ and the length of the interval is configured to be equal to a length of the system's unit interval. That is, t3 is equal to the reciprocal of the system frequency f, i.e., 1/f. Moreover, the length of Interval 2 is configured to be 64 times that of Interval 3 (i.e., t2=64/f) and the length of Interval 1 is configured to be 64 times that of Interval 2 (i.e., t1=64*64/f). The length of Interval 3 determines a minimum resolvable amount of charge to be discharged from the integrator A2 for reference subtraction, i.e., $Qdc=I0*t3=I_{min}*1/f$. An equivalent minimum capacitance is $(I_{min}*1/f)/Vin$, where Vin represents an input voltage.

Therefore, a total amount of charge discharged from the integrator A2 by the individual lower current minors under the control of the switching signal SAW<6:1> can be expressed as:

$$Qdc=Qdc1_{(Interval\ 1)}+Qdc2_{(Interval\ 2)}+Qdc3_{(Interval\ 3)}$$

$$=Na1_{(Interval\ 1)}*I0*t1+Na2_{(Interval\ 2)}*I0*t2+Na3_{(Interval\ 3)}*I0*t3$$

$$=\{64*64*Na1_{(Interval\ 1)}+64*Na2_{(Interval\ 2)}+Na3_{(Interval\ 3)}\}*I0*t3.$$

$Na1_{(Interval\ 1)}$ represents a Na value indicated by the SAW<6:1> in Interval 1. $Na1_{(Interval\ 1)}$ is a 6-bit binary value taken from the range of 0-63. In Interval 1, the most significant 6 bits of the amount of charge Qdc can be controlled by $Na1_{(Interval\ 1)}$. $Na2_{(Interval\ 2)}$ represents a Na value indicated by the SAW<6:1> in Interval 2. $Na2_{(Interval\ 2)}$ is also a 6-bit binary value taken from the range of 0-63. In Interval 2, the intermediate significant 6 bits of the amount of charge Qdc can be controlled by $Na2_{(Interval\ 2)}$. $Na3_{(Interval\ 3)}$ represents a Na value indicated by the SAW<2:1> in Interval 3. $Na3_{(Interval\ 3)}$ is a 6-bit binary value taken from the range of 0-3. In Interval 3, the least significant 6 bits of the amount of charge Qdc can be controlled by $Na3_{(Interval\ 3)}$. In this way, an overall Qdc amount over the three time intervals can be adjusted with 18 bits in a continuous manner.

It is to be noted that although the output from the charge output block 103 has been described in the foregoing embodiments as being bidirectional to inject or draw charge to or from the inverting input of the integrator 11 (i.e., provide a current of charge flowing to or out of the integrator 11), the present invention is not so limited because in other embodiments, the output of the charge output block 103 may also be unidirectional. In these cases, for example, the upper circuits in the current source branches of FIG. 5 (including the first upper transistors, the second upper transistors and the upper control switches therein) may be omitted so that the charge output block 103 can only provide a current flowing out of the integrator 11. Alternatively, the lower circuits in the current source branches of FIG. 5 (including the first lower transistors, the second lower transistors and the lower control switches therein) may be omitted so that the charge output block 103 can only provide a current flowing into the integrator 11. Moreover, in these implementations with unidirectional output of the charge output block 103, the circuits of the current mirror block 102, the reference current generation block 101 and other block may be adapted to remove circuit parts providing unwanted signals to the charge output block 103.

It is also to be noted that although the foregoing embodiments have been described as including the cascaded transistors and other elements, the present invention is not so limited because in other embodiments, the cascaded transistors may be omitted in other embodiments of the present invention.

Based on the same inventive concept, referring to FIG. 5, the present invention also provides an analog-to-digital converter (ADC) including an integrator 11 and the charge source circuit 10 described herein. The charge source circuit 10 is coupled at an output thereof to an inverting input of the integrator 11 and configured to provide an amount of charge Qdc to the integrator 11. The integrator 11 is configured for reference subtraction based on the amount of charge Qdc and to output a corresponding digital signal.

Based on the same inventive concept, referring to FIG. 5, the present invention also provides an organic light-emitting diode (OLED) touch panel including an input electrode (not shown) and the above ADC. The charge source circuit 10 in the ADC is coupled to the input electrode and configured to draw or inject an amount of charge Qdc from or to sensed charge on the input electrode. The ADC is configured to output a digital signal based on an amount of sensed charge remaining from the drawing or injection of the amount of charge Qdc by the charge source circuit 10.

In summary, in the charge source circuit, ADC and OLED touch panel of the present invention, an amount of charge is provided according to Qdc=Idc*t, rather than Qdc=Vcom*Cin as conventionally done. This dispenses with the use of a voltage division technique, a drive operational amplifier and too many capacitors, thus resulting in circuit simplicity, reduced cost and circuit layout area savings. More importantly, current Idc and time interval sequences may be designed to enable, with a very small area and a very small voltage, continuous adjustability of the amount of charge Qdc within a desired range at a higher resolution. Correspondingly, an equivalent capacitance C corresponding to the amount of charge Qdc can be adjusted within a range from tens of fF to hundreds of pF. By employing the charge source circuit, the ADC does not necessarily have a wide input range. The charge source circuit employed in the OLED touch panel for reference subtraction (DC subtraction) can draw or inject such an amount of charge from or to sensed charge on an input electrode of the OLED touch panel, thereby enhancing reference subtraction performance of the OLED touch panel and increasing touch detection accuracy thereof.

The description presented above is merely that of a few preferred embodiments of the present invention and is not intended to limit the scope thereof in any sense. Any and all changes and modifications made by those of ordinary skill in the art based on the above teachings fall within the scope as defined in the appended claims.

What is claimed is:

1. A charge source circuit, comprising:
a reference current generation block configured to provide a reference current;
a current minor block coupled to the reference current generation block and configured to minor the reference current; and
a charge output block coupled to the current minor block and configured to convert the mirrored current from the current mirror block into a corresponding amount of charge and output the amount of charge according to the following formula:

Qdc=Idc*t, where Qdc is the amount of charge output from the charge output block, Idc is a current provided by the charge output block, and t is a period of time in which the charge output block provides the current, wherein the period t is divided into at least two consecutive time intervals with lengths which form a sequence with ratios equal to a power of 2, thereby enabling continuous adjustability of the amount of charge Qdc.

2. The charge source circuit of claim 1, wherein between any two consecutive ones of the time intervals, the difference between a minimum possible amount of charge Qdc provided in the earlier time interval and a maximum possible amount of charge Qdc provided in the later time interval is equal to a minimum resolvable amount of charge Qdc for the later time interval.

3. The charge source circuit of claim 2, wherein the charge output block provides binary-weighted currents Idc in the respective time intervals.

4. The charge source circuit of claim 2, wherein each of the currents Idc provided by the charge output block in the respective time intervals is adjustable within a maximum range represented by k bits, and wherein if the amount of charge Qdc is desired to be adjustable within a range represented by M bits, where M is greater than k+1 and is divisible by k, the number n of the time intervals of the period t is equal to M/k, and an amount of charge Qdc provided in each of the n time intervals is adjustable within a range represented by k bits; or if the amount of charge Qdc is desired to be adjustable within a range represented by M bits, where M is greater than k+1 and is indivisible by k, the number n of the time intervals of the period t is equal to int(M/k)+1, an amount of charge Qdc provided in each of the first n-1 time intervals is adjustable within a range represented by k bits, and an amount of charge Qdc provided in the last time interval is adjustable within a range represented by M-(n-1)*k bits.

5. The charge source circuit of claim 4, wherein the n time intervals form a chronological sequence with ratios equal to a negative power of 2 and their lengths decrease progressively.

6. The charge source circuit of claim 3, wherein the charge output block comprises k current source branches, where k≥2, each of the current source branches comprising current sources and control switches for output strobe of the current sources, each of the current sources having a control terminal coupled to the current mirror block, and wherein the charge output block outputs the binary-weighted currents Idc in the respective time intervals by controlling outputs of the k current source branches through switching on or off the individual control switches.

7. The charge source circuit of claim 3, wherein the charge output block comprises k current source branches, where k≥2, each of the current source branches comprising an upper current source, an upper control switch, a lower control switch and a lower current source, which are connected sequentially, the upper current sources and the upper control switches controlling current drawing of the k current source branches, the lower current sources and the lower control switches controlling current injection of the k current source branches.

8. The charge source circuit of claim 7, wherein each upper current source comprises cascaded PMOS transistors and each lower current source comprises cascaded NMOS transistors.

9. The charge source circuit of claim 1, wherein the reference current generation block is a constant-current source.

10. The charge source circuit of claim 1, wherein the reference current generation block comprises an operational amplifier, a first switching transistor, a second switching transistor and a resistor, the first switching transistor having a drain coupled to a source of the second switching transistor, the second switching transistor having a drain coupled to one end of the resistor and a non-inverting input of the operational amplifier, the first switching transistor having a gate coupled to an output of the operational amplifier.

11. The charge source circuit of claim 1, wherein the current mirror block comprises an upper primary mirror transistor, an upper cascaded transistor, a lower cascaded transistor and a lower primary mirror transistor, which are connected sequentially, the upper primary mirror transistor having a gate coupled to corresponding terminals of the reference current generation block and the charge output block, the lower primary mirror transistor having a gate coupled to a corresponding terminal of the charge output block.

12. An analog-to-digital converter (ADC) comprising an integrator and a charge source circuit, wherein charge source circuit comprising:

a reference current generation block configured to provide a reference current;

a current mirror block coupled to the reference current generation block and configured to mirror the reference current; and a charge output block coupled to the current mirror block and configured to convert the mirrored current from the current mirror block into a corresponding amount of charge and output the amount of charge according to the following formula:

Qdc=Idc*t, where Qdc is the amount of charge output from the charge output block, Idc is a current provided by the charge output block, and t is a period of time in which the charge output block provides the current, wherein the period t is divided into at least two consecutive time intervals with lengths which form a sequence with ratios equal to a power of 2, thereby enabling continuous adjustability of the amount of charge Qdc.

13. The ADC of claim 12, wherein an output of the charge source circuit is coupled to an inverting input of the integrator and configured to provide an amount of charge to the integrator, and wherein the integrator is configured for reference subtraction based on the amount of charge.

14. The ADC of claim 12, wherein between any two consecutive ones of the time intervals, the difference between a minimum possible amount of charge Qdc provided in the earlier time interval and a maximum possible amount of charge Qdc provided in the later time interval is equal to a minimum resolvable amount of charge Qdc for the later time interval.

15. The ADC of claim 14, wherein the charge output block provides binary-weighted currents Idc in the respective time intervals.

16. The ADC of claim 14, wherein each of the currents Idc provided by the charge output block in the respective time intervals is adjustable within a maximum range represented by k bits, and wherein if the amount of charge Qdc is desired to be adjustable within a range represented by M bits, where M is greater than k+1 and is divisible by k, the number n of the time intervals of the period t is equal to M/k, and an amount of charge Qdc provided in each of the n time intervals is adjustable within a range represented by k bits; or if the amount of charge Qdc is desired to be adjustable within a range represented by M bits, where M is greater than k+1 and is indivisible by k, the number n of the time intervals of the period t is equal to int(M/k)+1, an amount of charge Qdc provided in each of the first n-1 time intervals is adjustable within a range represented by k bits, and an amount of charge Qdc provided in the last time interval is adjustable within a range represented by M-(n-1)*k bits.

17. The ADC of claim 16, wherein the n time intervals form a chronological sequence with ratios equal to a negative power of 2 and their lengths decrease progressively.

18. An organic light-emitting diode (OLED) touch panel comprising an input electrode and an ADC, wherein the ADC comprising an integrator and a charge source circuit, wherein charge source circuit comprising:
- a reference current generation block configured to provide a reference current;
- a current minor block coupled to the reference current generation block and configured to minor the reference current; and
- a charge output block coupled to the current minor block and configured to convert the mirrored current from the current mirror block into a corresponding amount of charge and output the amount of charge according to the following formula:

Qdc=Idc*t, where Qdc is the amount of charge output from the charge output block, Idc is a current provided by the charge output block, and t is a period of time in which the charge output block provides the current, wherein the period t is divided into at least two consecutive time intervals with lengths which form a sequence with ratios equal to a power of 2, thereby enabling continuous adjustability of the amount of charge Qdc.

19. The OLED touch panel of claim 18, wherein an output of the charge source circuit is coupled to an inverting input of the integrator and configured to provide an amount of charge to the integrator, and wherein the integrator is configured for reference subtraction based on the amount of charge.

20. The OLED touch panel of claim 18, wherein the charge source circuit in the ADC is coupled to the input electrode and configured to draw or inject an amount of charge from or to sensed charge present on the input electrode, and wherein the ADC is configured to output a corresponding digital signal based on an amount of the sensed charge remaining after drawing or injecting the amount of charge by the charge source circuit.

\* \* \* \* \*